United States Patent [19]

Steele

[11] Patent Number: 5,635,774

[45] Date of Patent: Jun. 3, 1997

[54] ZERO POWER LATCHUP SUPPRESSION CIRCUIT

[75] Inventor: Randy C. Steele, Folsom, Calif.

[73] Assignee: SGS-Thomson Microelectronics, Inc., Carrollton, Tex.

[21] Appl. No.: 157,650

[22] Filed: Nov. 24, 1993

[51] Int. Cl.[6] .................................................. H02J 1/00
[52] U.S. Cl. .......................... 307/86; 307/66; 323/908; 365/229
[58] Field of Search ........................ 307/64–66, 85–87; 365/226, 227, 228, 229; 323/908

[56] References Cited

U.S. PATENT DOCUMENTS

| | | | |
|---|---|---|---|
| 4,716,511 | 12/1987 | Masaki | 363/49 |
| 4,908,790 | 3/1990 | Little et al. | 365/229 |
| 4,984,211 | 1/1991 | Tran | 365/229 |
| 5,099,453 | 3/1992 | Steele | 365/229 |
| 5,148,042 | 9/1992 | Nakazoe | 307/65 |
| 5,241,508 | 8/1993 | Berenguel | 365/229 |
| 5,278,798 | 1/1994 | Miyawaki | 365/229 |
| 5,306,961 | 4/1994 | Leo | 365/229 |
| 5,307,318 | 4/1994 | Nemoto | 365/226 |
| 5,315,549 | 5/1994 | Scherpenberg et al. | 365/229 |

*Primary Examiner*—David S. Martin
*Assistant Examiner*—Jonathan S. Kaplan
*Attorney, Agent, or Firm*—Theodore E. Galanthay; Kenneth C. Hill; Lisa K. Jorgenson

[57] ABSTRACT

A zero power circuit includes an upper power supply voltage pad, battery pad, a power control circuit, and a suppression circuit. The power control circuit provides power to the zero power circuit by switching between the battery pad and the upper power supply voltage pad. The suppression circuit is connected in series between the power control circuit and the battery pad. The suppression circuit includes a resistor connected in series between the battery pad and the power control circuit, wherein current flowing through the transistor during a latch condition causes the voltage to drop across the resistor, suppressing the latchup condition to the battery pad. The suppression circuit also includes a transistor connected in parallel with the resistor, the transistor having a gate, wherein a first signal applied to the gate turns off the transistor and a second signal applied to the gate turns on the transistor, wherein the resistor is shorted when the transistor is turned on.

36 Claims, 1 Drawing Sheet

ZERO POWER LATCHUP SUPPRESSION CIRCUIT

BACKGROUND OF THE INVENTION

1. Field of the Invention

The present invention relates to integrated circuits and in particular to MOS integrated circuits. Still more particularly, the present invention relates to the suppression of latchup to a battery in a zero power circuit system.

2. Description of the Prior Art

In some situations, it is desirable to provide for retention of data in integrated circuits such as memory devices. A number of circuits are commercially available for retaining data in SRAMS when power is removed. An example of one such device may be found in U.S. Pat. No. 5,099,453, entitled *Configuration Memory For Programmable Logic Device*, U.S. Pat. No. 4,713,555, entitled *Battery Charging Protection Circuit*; U.S. Pat. No. 4,122,359, entitled *Memory Protection Arrangement*; and U.S. Pat. No. 4,451,742, entitled *Power Supply Control For Integrated Circuit*. These devices are often known as "zero power circuits". Typically, in a zero power circuit, the contents of the circuit are protected in the event that the power supply voltage to that circuit drops below some predetermined or selected threshold voltage. This protection may be accomplished by switching the circuit from a primary power supply to a secondary power supply, typically an integral battery, when the voltage of the primary power supply drops below the selected threshold voltage.

Power control circuits exist which provide automatic sensing of a primary power source voltage. These power control circuits provide for automatic switching to a secondary power source when the primary power source voltage drops below a predetermined threshold voltage. A resistor is typically placed in series with the pad connecting the circuit to the battery. The resistor is a common industry requirement used to suppress latchup to the battery. If latchup were to occur, the sustaining current would drop most of the battery voltage across the resistor, and as a result, latchup would not be sustained.

Referring to FIG. 1, a block diagram of a zero power static random access memory (SRAM) chip is illustrated. Chip 10 includes a pad 12 that leads to the VCC pin of the chip and a pad 14, which is connected to a battery. The battery may be contained in the packaging of the chip or off the chip. Pads 12 and 14 are connected to power control circuit 16, also called a "switching circuit". Resistor 18 is placed between pad 14 and power control circuit 16 to suppress latchup to the battery. Power control circuit 16 controls the supply of power to SRAM 20 and input/output (I/O) circuits 22 and 24. I/O circuits 22 and 24 may include, for example, I/O buffers. In the event that the power supply VCC drops below a predetermined threshold at pad 12, power control circuit 16 switches to pad 14 to provide power to chip 10. In addition, power control circuit 16 may disable nonessential circuitry such as I/O circuits 22 and 24 while maintaining power to SRAM 20.

When chips are surface mounted, the high temperatures resulting from the surface mount procedure may cause high leakage currents that could potentially drop all of the battery voltage across resistor 18. The loss of power may cause a loss of data previously programmed into SRAM 20.

Therefore, it would be desirable to have a method and apparatus for preventing loss of power to a zero power circuit containing data during surface mount operations or during other events that may cause high leakage currents to occur.

SUMMARY OF THE INVENTION

The present invention provides a zero power circuit that includes a power supply voltage pad, battery pad, a power control circuit, and a suppression circuit. The power control circuit provides power to the zero power circuit by switching between the battery pad and the power supply voltage pad. The suppression circuit is connected in series between the power control circuit and the battery pad. The suppression circuit includes a resistor connected in series between the battery pad and the power control circuit, wherein current flowing through the resistor during a latchup condition causes the voltage to drop across the resistor, suppressing the latchup condition to the battery pad. The suppression circuit also includes a transistor connected in parallel with the resistor, the transistor having a gate, wherein a first signal applied to the gate turns off the transistor and a second signal applied to the gate turns on the transistor, wherein the resistor is shorted when the transistor is turned on. The resistor may be a polycrystalline silicon transistor.

A control circuit also may be included to turn the transistor on and off. The control circuit may include an inverter circuit having an input and an output, wherein the input is connected to the power control circuit and the output is connected to the gate of the transistor and a capacitive circuit having a first end connected between the output of the inverter circuit and the gate of the transistor and a second end connected to a lower power supply voltage. The capacitive circuit provides a delay time before the transistor is turned on. The time delay may be an RC delay provided by a transistor configured as a capacitor.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
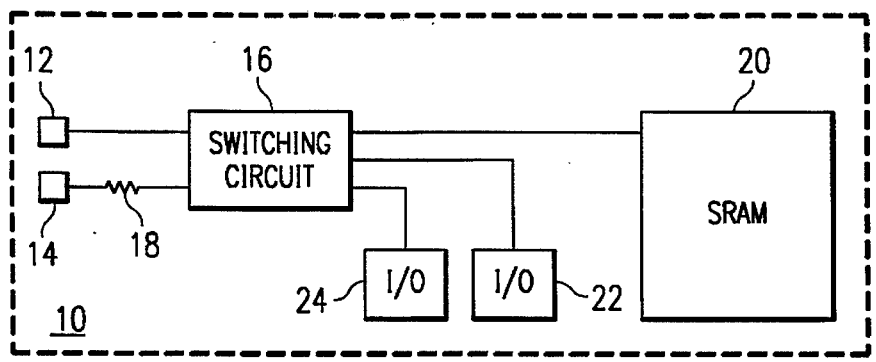
FIG. 1 is a block diagram of a zero power static random access memory chip known in the prior art.
Figure 2:
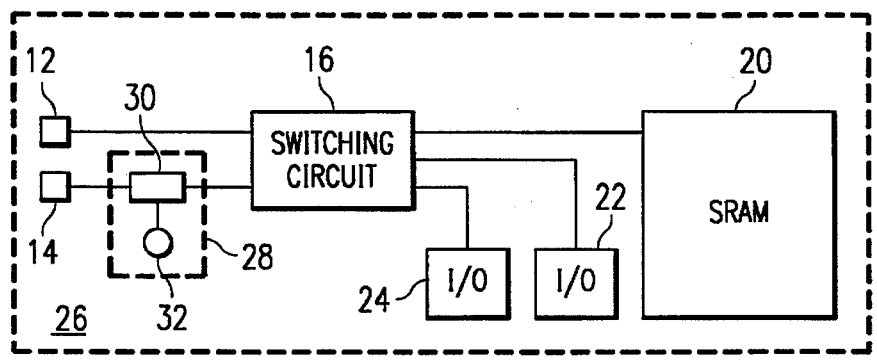
FIG. 2 illustrates a block diagram of a zero power static random access memory chip according to the present invention.

Referring now to FIG. 2, a block diagram of a zero power SRAM chip is depicted in accordance with a preferred embodiment of the present invention. Chip 26 is identical to chip 10 in FIG. 1 except that resistor 18 in FIG. 1 has been replaced with a latchup suppression circuit 28. Latchup suppression circuit 28 includes a suppression circuit 30 and a control circuit 32. Suppression circuit 30 controls the voltage drop from the battery while control circuit 32 controls the latchup suppression function in circuit 30. Control circuit 32 is turned on and off by power control circuit 16.

Figure 3:
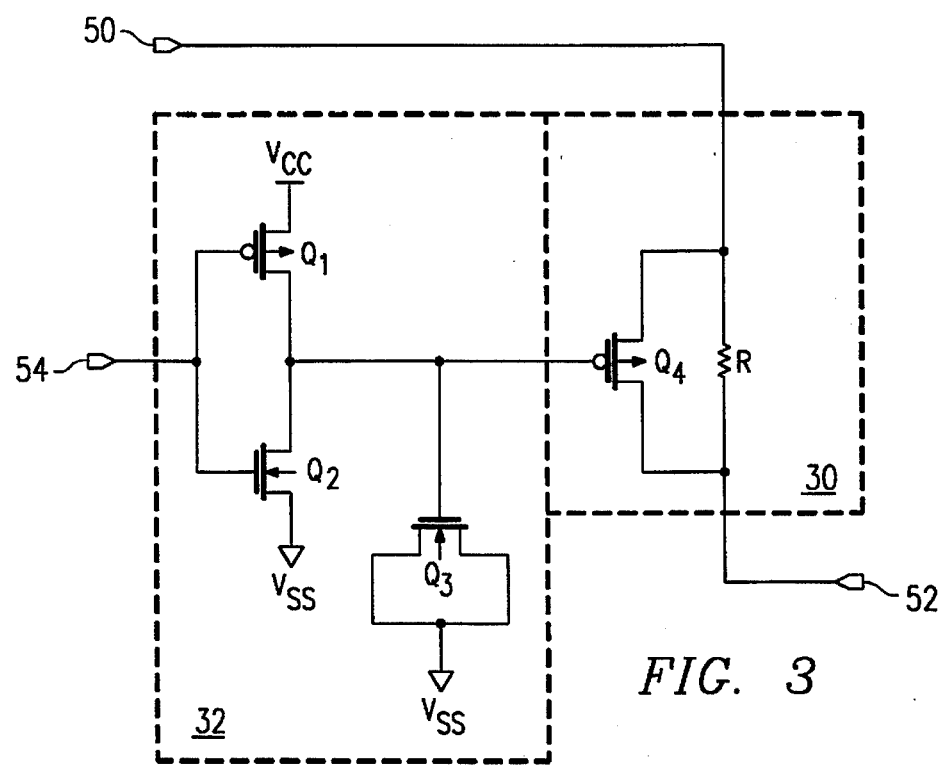
FIG. 3 is a schematic diagram of a suppression circuit according to the present invention.

Referring now to FIG. 3, a schematic diagram of a latchup suppression circuit 28, which includes a suppression circuit 30 and a control circuit 32, is illustrated. Point 50 is connected to pad 14 in FIG. 2 while point 52 is connected to power control circuit 16 in FIG. 2. Point 54 also is connected to power control circuit 16 and serves to provide a control signal to control circuit 32. Control circuit 32 includes an inverter constructed from transistors Q1 and Q2. Transistor Q3 is connected as a capacitor in control circuit 32. Suppression circuit 30 includes resistor R and a switch such as transistor Q4. Transistor Q4 is a p-channel metal-oxide field effect (MOSFET) transistor, which is provided to short out resistor R when power supply voltage VCC less than a predetermined threshold voltage. In such a situation, power control circuit 16 in FIG. 2 provides a high input signal, VCCSW, to point 54. As a result, the output from the inverter, created by transistors Q1 and Q2, turns on transistor Q4 which in turn shorts out resistor R. When signal VCCSW is low, transistor Q4 is turned off and current flows through resistor R.

According to a preferred embodiment of the present invention, resistor R is a polycrystalline silicon resistor. Additionally, resistor R may have a value of about 6 k ohms. The value of resistor R, of course, may vary depending upon the circuitry employed.

The shorting of resistor R during surface mount procedures prevents high leakage currents, resulting from the high temperature operation, from dropping most of the voltage across resistor R and causing a loss of programmed data in a memory, such as SRAM 20 in FIG. 2.

An RC delay is provided by transistor Q3 to prevent transistor Q4 from turning on immediately as the chip switches to the battery. This delay provides time for resistor R to suppress latchup before the resistor is shorted out.

Thus, the present invention prevents loss of data during surface mount operations through the prevention of all of the battery voltage dropping across resistor R. This is accomplished with transistor Q4. Additionally, the present invention provides circuitry to suppress latchup to the battery before the resistor is shorted out. Other types of switches other than transistor Q4 may be used in suppression circuit 30. The present invention continues to provide latchup protection even after surface mounting. The present invention is depicted using MOS technology. Other types of technology and transistors may be employed in accordance with a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A zero power circuit comprising:
   a power supply voltage pad;
   a battery pad;
   a power control circuit connected to the power supply voltage pad and the battery pad, wherein the power control circuit provides power to a load by switching between the battery pad and the power supply voltage pad; and
   a suppression circuit connected in series between the power control circuit and the battery pad, the suppression circuit including:
      a resistor connected in series between the battery pad and the power control circuit, wherein current flowing through the resistor during a latchup condition causes a voltage to drop across the resistor, suppressing the latchup condition to the battery pad; and
      a switch connected in parallel with the resistor, wherein the switch may be turned on and off and wherein the resistor is shorted out when the switch is turned on in response to a drop in a power supply voltage.

2. The zero power circuit of claim 1, wherein the switch is a transistor having a gate, wherein a first signal applied to the gate turns off the transistor and a second signal applied to the gate turns on the transistor, wherein the resistor is shorted when the transistor is turned on.

3. The zero power circuit of claim 1, wherein the transistor is a FET.

4. The zero power circuit of claim 1, wherein the suppression circuit further includes:
   a control circuit including:
      an inverter circuit having an input and an output, wherein the input is connected to the power control circuit and the output is connected to the gate of the transistor; and
      a capacitive circuit having a first end connected between the output of the inverter circuit and the gate of the transistor and a second end connected to a lower power supply voltage, wherein the capacitive circuit provides a delay time before the transistor is turned on.

5. The zero power circuit of claim 4, wherein the capacitive circuit comprises a second transistor having a gate connected to the first end of the capacitive circuit and a source and a drain connected to the second end of the capacitive circuit.

6. The zero power circuit of claim 1, wherein the resistor is a polycrystalline silicon resistor.

7. The zero power circuit of claim 1, wherein the power supply voltage pad is connected to a VCC power supply voltage.

8. A zero power circuit comprising:
   power supply voltage pad;
   a battery pad;
   a power control circuit connected to the power supply voltage pad and the battery pad, wherein the power control circuit provides power to to a load by switching between the battery pad and the power supply voltage pad; and
   a suppression circuit connected in series between the power control circuit and the battery pad, the suppression circuit including:
      a resistor connected in series between the battery pad and the power control circuit, wherein current flowing through the resistor during a latchup condition causes a voltage to drop across the resistor, suppressing the latchup condition to the battery pad; and
      a transistor connected in parallel with the resistor, the transistor having a gate, wherein a first signal applied to the gate turns off the transistor and a second signal applied to the gate turns on the transistor, wherein the resistor is shorted out when the transistor is turned on.

9. The zero power circuit of claim 8, wherein the suppression circuit further includes:
   a control circuit including:
      an inverter circuit having an input and an output, wherein the input is connected to the power control circuit and the output is connected to the gate of the transistor; and
      a capacitive circuit having a first end connected between the output of the inverter circuit and the gate of the transistor and a second end connected to a second power supply voltage, wherein the capacitive circuit provides a delay time before the transistor is turned on.

10. The zero power circuit of claim 9, wherein the capacitive circuit comprises a second transistor having a gate connected to the first end of the capacitive circuit and a source and a drain connected to the second end of the capacitive circuit.

11. The zero power circuit of claim 8, wherein the resistor is a polycrystalline silicon resistor.

12. The zero power circuit of claim 11, wherein the resistor has a value of approximately 6 k ohms.

13. The zero power circuit of claim 8, wherein the transistor is a p-channel FET.

14. The zero power circuit of claim 8, wherein the transistor is a n-channel FET.

15. The zero power circuit of claim 8, wherein the power supply pad is connected to a VCC power supply voltage.

16. A latchup suppression circuit for use between a battery pad and a power control circuit comprising:
   a resistor connected in series between the battery pad and the power control circuit, wherein current flowing through the resistor during a latchup condition causes the voltage to drop across the resistor, suppressing the latchup condition to the battery pad;
   a transistor connected in parallel with the resistor, the transistor having a gate, wherein a first signal applied to the gate turns off the transistor and a second signal applied to the gate turns on the transistor, wherein the resistor is shorted out when the transistor is turned on;
   an inverter circuit having an input and an output, wherein the input is connected to the power control circuit and the output is connected to the gate of the transistor; and
   a capacitive circuit having a first end connected between the output of the inverter circuit and the gate of the transistor and a second end connected to a power supply voltage, wherein the capacitive circuit provides a delay time before the transistor is turned on.

17. The latchup suppression circuit of claim 16, wherein the capacitive circuit comprises a second transistor having a gate connected to the first end of the capacitive circuit and a source and a drain connected to the second end of the capacitive circuit.

18. The latchup suppression circuit of claim 16, wherein the resistor is a polycrystalline silicon resistor.

19. The latchup suppression circuit of claim 18, wherein the resistor has a value of approximately 6 k ohms.

20. The latchup suppression circuit of claim 16, wherein the transistor is a p-channel FET.

21. The latchup suppression circuit of claim 16, wherein the transistor is a n-channel FET.

22. A zero power static random access memory device comprising:
   a power supply voltage;
   a battery power supply;
   a static random access memory;
   a power control circuit, wherein the power control circuit is connected to the power supply voltage, the battery power supply, and the static random access memory and provides power to the static random access memory by switching between the battery power supply and the power supply voltage pad; and
   a suppression circuit connected in series between the power control circuit and the battery power supply, the suppression circuit including:
      a resistor connected in series between the battery power supply and the power control circuit, wherein current flowing through the resistor during a latchup condition causes a voltage to drop across the resistor, suppressing the latchup condition to the battery power supply; and
      a transistor connected in parallel with the resistor, the transistor having a gate, wherein a first signal applied to the gate turns off the transistor and a second signal applied to the gate turns on the transistor, wherein the resistor is substantially shorted when the transistor is turned on.

23. The zero power static random access memory chip of claim 22, wherein the suppression circuit further includes:
   a control circuit including:
      an inverter circuit having an input and an output, wherein the input is connected to the power control circuit and the output is connected to the gate of the transistor; and
      a capacitive circuit having a first end connected between the output of the inverter circuit and the gate of the transistor and a second end connected to a lower power supply voltage, wherein the capacitive circuit provides a delay time before the transistor is turned on.

24. The zero power static random access memory chip of claim 23, wherein the power supply voltage pad is connected to a VCC power supply voltage.

25. A method for preventing loss of power to a zero power circuit during surface mounting of the zero power circuit and for providing for latchup conditions, the method comprising:
   providing a resistor in series between a battery pad and a power control circuit;
   connecting a transistor in parallel with the resistor; and
   turning on the transistor when power to the zero power circuit is switched between a primary power source and a battery power source, wherein loss of power to the zero power circuit is prevented.

26. The method of claim 25, wherein the transistor is a p-channel transistor.

27. The method of claim 25, wherein the resistor is a polycrystalline silicon resistor.

28. The method of claim 25 further comprising providing a time delay to prevent the transistor from turning on immediately when the zero power circuit is connected to a battery power source.

29. The method of claim 25, wherein the time delay is provided by a second transistor configured as a capacitor.

30. A zero power circuit comprising:
   a first power supply voltage input for connection to a first power supply;
   a second power supply voltage input for connection to a second power supply;
   a power control circuit coupled to the first power supply voltage input, the second power supply voltage input and a load, the power control circuit providing power to the load by switching between the first power supply voltage input and the second power supply voltage input; and
   a suppression circuit connected in series between the power control circuit and the second power supply voltage input, the suppression circuit including;
      a resistor connected in series between the second power supply and voltage input and the power control circuit, wherein current flowing through the resistor during a latchup condition causes a voltage to drop across the resistor, suppressing the latchup condition to the second power supply voltage input; and
      a switch connected in parallel with the resistor, wherein the switch may turned on and off so that the resistor is substantially shorted when the switch is turned on.

31. The zero power circuit of claim 30, wherein the suppression circuit further includes a control circuit comprising:

an inverter circuit having an input and an output, wherein the input is connected to the power control circuit and the output is connected to the gate of the transistor; and a capacitive circuit having an first end connected to the output of the inventor circuit and the gate of the transistor and a second end connected to a third power supply voltage, wherein the capacity of circuit provides a delay time before the transistor is turned on.

32. A system having a zero power circuit comprising:

a primary power source;

a secondary power source;

a primary input coupled to the primary power source;

a secondary input coupled to the secondary power source;

a power control circuit, wherein the power control circuit is connected to the primary input, the secondary input, and a load and wherein the power control circuit provides power to the load by switching between the primary input and the secondary input; and a suppression circuit connected in series between the power control circuit and the secondary input, the suppression circuit including:

a resistor connected in series between the secondary input and the power control circuit, wherein the current flowing through the resistor during a latchup condition causes a voltage to drop across the resistor, suppressing the latchup condition to the secondary input; and a switch connected in parallel with the resistor, wherein the switch may be turned on and off and wherein the resistor is substantially shorted when the switch is turned on.

33. The system of claim 32, wherein the switch is a transistor having a gate, wherein a first signal applied to the gate turns off the transistor and a second signal applied to the gate turns on the transistor.

34. The system of claim 33, wherein the suppression further includes a control circuit comprising:

an inverter circuit having an input and an output, wherein the input is connected to the power control circuit and the output is connected to the gate of the transistor; and a capacitive circuit having a first end connected to the output of the inverter circuit and the gate of the transistor and a second end connected to a third input, wherein the third input is connected to a secondary power source, wherein the capacitive circuit provides a delay time before the transistor is turned on.

35. The system of claim 34, wherein the load is a random access memory.

36. A zero power static random access memory device comprising:

a power supply voltage;

a battery power supply;

a static random access memory;

a power control circuit, wherein the power control circuit is connected to the power supply voltage, the power supply, and the static random access memory and provides power to the static random access memory by switching between the battery power supply and the power supply voltage; and a suppression circuit connected in series between the power supply circuit and the battery power supply, the suppression circuit including:

a resistor connected in series between the battery power supply and the power control circuit, wherein the current flowing through the resistor during a latchup condition causes a voltage to drop across the resistor, suppressing the latch-up condition to battery power supply; and a transistor connected in parallel with the resistor, wherein the transistor is turned on in response to a drop in the power supply voltage, wherein the resistor is substantially shorted when the transistor is turned on.

* * * * *